(12) United States Patent
Mukawa

(10) Patent No.: US 10,180,574 B2
(45) Date of Patent: *Jan. 15, 2019

(54) IMAGE DISPLAY APPARATUS

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,451

(22) Filed: Jun. 15, 2016

(65) Prior Publication Data

US 2016/0299345 A1 Oct. 13, 2016

Related U.S. Application Data

(63) Continuation of application No. 13/560,716, filed on Jul. 27, 2012, now Pat. No. 9,383,583, which is a
(Continued)

(30) Foreign Application Priority Data

Aug. 18, 2008 (JP) .................................. 2008-209857

(51) Int. Cl.
*G02B 27/01* (2006.01)
*G02B 26/10* (2006.01)
(Continued)

(52) U.S. Cl.
CPC ........... *G02B 27/0172* (2013.01); *G02B 5/18* (2013.01); *G02B 5/32* (2013.01); *G02B 6/0033* (2013.01);
(Continued)

(58) Field of Classification Search
USPC ....................... 359/618, 629–638; 385/15–52
See application file for complete search history.

(56) References Cited

U.S. PATENT DOCUMENTS 8,638,499 B2 * 1/2014 Mukawa .................. G02B 5/18
359/630
8,928,984 B2 * 1/2015 Mukawa .................. G02B 5/18
359/630
(Continued)

FOREIGN PATENT DOCUMENTS

EP 1 385 023 1/2004
EP 1 542 062 6/2005
(Continued)

OTHER PUBLICATIONS

Communication pursuant to Article 94(3) EPC dated Nov. 5, 2014 in corresponding European application No. 09010560.2 (5 pages).*
(Continued)

*Primary Examiner* — Kimberly N. Kakalec
(74) *Attorney, Agent, or Firm* — K&L Gates LLP

(57) ABSTRACT

An image display apparatus includes an image forming device, a collimating optical system, and an optical device. The optical device includes a light guide plate, a first deflecting member that deflects light incident on the light guide plate, and a second deflecting member that deflects the light, which propagates in the light guide plate by total reflection, a plurality of times. The first and second deflecting members are provided in the light guide plate. Light having one wavelength emitted from at least one pixel satisfies the following condition:

$2t\sin\theta - 2 \leq W_Y \leq 2t\sin\theta + 2$ where an axial direction of the light guide plate is the Y-direction, $W_Y$ prepresents the width in the Y-direction of the light incident on the light guide plate, t represents the thickness of the light guide plate, and $\theta$ represents the total reflection angle.

19 Claims, 14 Drawing Sheets

Related U.S. Application Data continuation of application No. 12/539,323, filed on Aug. 11, 2009, now Pat. No. 8,638,499.

(51) Int. Cl.
*G02B 5/32* (2006.01)
*G02B 27/00* (2006.01)
*G02B 5/18* (2006.01)
*F21V 8/00* (2006.01)

(52) U.S. Cl.
CPC ......... *G02B 6/0055* (2013.01); *G02B 26/101* (2013.01); *G02B 27/0081* (2013.01); *G02B 26/10* (2013.01); *G02B 2027/0112* (2013.01); *G02B 2027/0118* (2013.01); *G02B 2027/0174* (2013.01)

(56) References Cited

U.S. PATENT DOCUMENTS

| | | | |
|---|---|---|---|
| 9,075,232 B2 * | 7/2015 | Mukawa | G02B 5/18 |
| 9,383,583 B2 * | 7/2016 | Mukawa | G02B 5/18 |
| 2003/0165017 A1 | 9/2003 | Amitai | |
| 2005/0248818 A1 * | 11/2005 | Ouchi | G02B 27/0172 |
| | | | 359/15 |
| 2006/0228073 A1 | 10/2006 | Mukawa et al. | |
| 2006/0291021 A1 * | 12/2006 | Mukawa | G02B 5/32 |
| | | | 359/15 |
| 2007/0008624 A1 * | 1/2007 | Hirayama | G02B 27/0081 |
| | | | 359/630 |
| 2007/0070504 A1 * | 3/2007 | Akutsu | G02B 5/1861 |
| | | | 359/573 |
| 2007/0159673 A1 * | 7/2007 | Freeman | G02B 5/1814 |
| | | | 359/19 |
| 2007/0188837 A1 * | 8/2007 | Shimizu | G02B 5/203 |
| | | | 359/13 |

FOREIGN PATENT DOCUMENTS

| | | |
|---|---|---|
| JP | HEI 08-184779 | 7/1996 |
| JP | 2000-056259 | 2/2000 |
| JP | 2004-069868 | 3/2004 |
| JP | 2005-521099 | 7/2005 |
| JP | 2006-162767 | 6/2006 |
| JP | 2007-094175 | 4/2007 |
| JP | 2008-083539 | 4/2008 |
| WO | 2005093493 | 10/2005 |
| WO | 2007062098 | 5/2007 |

OTHER PUBLICATIONS

Japanese Office Action dated Jul. 6, 2010 corresponding to Japanese Patent Appln. No. 2008-209857.

European Search Report for corresponding Application No. 09010560.2-2217 dated Oct. 6, 2009.

European Search Report dated Jun. 4, 2012 for corresponding Application No. 09010560.2.

Communication pursuant to Article 94(3) EPC dated Oct. 5, 2016 in corresponding European application No. 09010560.2 (4 pages).

* cited by examiner

US 10,180,574 B2

IMAGE DISPLAY APPARATUS

CROSS REFERENCES TO RELATED APPLICATIONS

The present application is a continuation of U.S. application Ser. No. 13/560,716, filed Jul. 27, 2012, which is a continuation of U.S. application Ser. No. 12/539,323, filed on Aug. 11, 2009, which contains subject matter related to that disclosed in Japanese Priority Patent Application JP 2008-209857 filed in the Japan Patent Office on Aug. 18, 2008, the entire contents of which are hereby incorporated by reference.

BACKGROUND

The present application relates to an image display apparatus used to allow an observer to view a two-dimensional image formed by an image forming device and so on.

Japanese Unexamined Patent Application Publication (Translation of PCT Application) No. 2005-521099 and Japanese Unexamined Patent Application Publication No. 2006-162767 disclose virtual-image display apparatuses (image display apparatuses) in which a virtual-image optical system allows an observer to view, as an enlarged virtual image, a two-dimensional image formed by an image forming device.

FIG. 1 is a conceptual view of such an image display apparatus. Referring to FIG. 1, an image display apparatus 700 (referred to as an image display apparatus 700 of a first type for convenience and denoted by reference numeral 100 in FIG. 1) includes an image forming device 711 (111 in FIG. 1) having a plurality of pixels arranged in a two-dimensional matrix, a collimating optical system 712 (112 in FIG. 1) for collimating light emitted from the pixels of the image forming device 711, and an optical device 720 (120 in FIG. 1) on which the light collimated by the collimating optical system 712 is incident. The incident light is guided and emitted from the optical device 720. The optical device 720 includes a light guide plate 721 (121 in FIG. 1), a first optical member 730 (130 in FIG. 1, for example, formed by a single-layer light reflective film), and a second optical member 740 (140 in FIG. 1, for example, formed by a light reflective multilayer film having a layered structure. Incident light propagates in the light guide plate 721 by total reflection and is then emitted from the light guide plate 721. The first optical member 730 reflects the light incident on the light guide plate 721 so that the incident light is totally reflected in the light guide plate 721, and the second optical member 740 emits the light, which propagates in the light guide plate 721 by total reflection, from the light guide plate 721. For example, when a HMD (Head-Mounted Display) is produced using this image display apparatus 700, the weight and size of the display can be reduced.

Further, Japanese Unexamined Patent Application Publication No. 2007-94175 discloses a virtual-image display apparatus (image display apparatus) using a hologram diffraction grating, in which a virtual-image optical system allows an observer to view, as an enlarged virtual image, a two-dimensional image formed by an image forming device.

FIG. 4A is a conceptual view of such an image display apparatus. Referring to FIG. 4A, an image display apparatus 800 (referred to as an image display apparatus 800 of a second type for convenience and denoted by reference numeral 300 in FIG. 4A) basically includes an image forming device 811 (111 in FIG. 4A) for displaying an image, a collimating optical system 812 (112 in FIG. 4A), and a virtual-image optical system (an optical device 820, denoted by reference numeral 320 in FIG. 4A) on which light displayed by the image forming device 811 is incident. The incident light is guided to the eye 10 of the observer. The optical device 820 includes a light guide plate 821 (321 in FIG. 4A), and a first diffraction grating member 830 (330 in FIG. 4A) and a second diffraction grating member 840 (340 in FIG. 4A) that are provided on the light guide plate 821. Each of the first and second diffraction grating members 830 and 840 is formed by a reflective volume hologram diffraction grating. Light emitted from the pixels in the image forming device 811 enters the collimating optical system 812, where the light is converted into parallel light, and the parallel light enters the light guide plate 821. The parallel light is incident on and is emitted from a first surface 822 (322 in FIG. 4A) of the light guide plate 821. On the other hand, the first and second diffraction grating members 830 and 840 are mounted on a second surface 823 (323 in FIG. 4A) of the light guide plate 821 parallel to the first surface 822.

SUMMARY

In the image display apparatus 700 of the first type, when the eye 10 of the observer is in a region A, as shown in FIG. 13, light emitted from the collimating optical system 712 reaches the eye 10. However, when the eye 10 is in a region B between regions A, no light is emitted from the collimating optical system 712 and reaches the eye 10. Even if light is emitted, the amount of emitted light decreases seriously. In FIG. 13, regions A are diagonally shaded for clear illustration. Thus, in the image display apparatus 700 of the first type, brightness unevenness and color evenness are caused in a displayed image, depending on the position of the eye of the observer.

In the image display apparatus 800 of the second type, the second diffraction grating member 840 gradually emits light from the light guide plate 821 while reflecting and diffracting the light a plurality of times in order to perform display with a wider angle of view without increasing the thickness of the light guide plate 821 and to enlarge the range where the observer can view the image (eye box). Even in the image display apparatus 800 of the second type, when the eye 10 of the observer is in a region A or a region C, as shown in FIG. 14, parallel light emitted from the collimating optical system 812 reaches the eye 10. However, when the eye 10 is in a region B, no light is emitted from the collimating optical system 812 and reaches the eye 10. Even if light is emitted, the amount of emitted light decreases seriously. Therefore, in the image display apparatus 800 of the second type, brightness unevenness and color evenness are also caused in a displayed image, depending on the position of the eye of the observer.

It is desirable to provide an image display apparatus having a configuration such as to minimize brightness unevenness and color unevenness when viewing a two-dimensional image formed by an image forming device and the like even if the position of the eye of an observer moves.

An image display apparatus according to an embodiment includes:

(A) an image forming device including a plurality of pixels arranged in a two-dimensional matrix;

(B) a collimating optical system configured to convert light emitted from each of the pixels in the image forming device into parallel light; and (C) an optical device on which the parallel light is incident from the collimating optical system, in which the parallel light is guided, and from which the parallel light is emitted.

The optical device includes:

(a) a light guide plate from which the incident light is emitted after propagating in the light guide plate by total reflection;

(b) first deflecting means configured to deflect the light incident on the light guide plate so that the incident light is totally reflected in the light guide plate; and (c) second deflecting means configured to deflect the light, which propagates in the light guide plate by total reflection, a plurality of times so as to emit the light from the light guide plate.

The term "total reflection" refers to total internal reflection or total reflection in the light guide plate. This also applies to the following.

In the image display apparatus of the embodiment, the first deflecting means and the second deflecting means are provided in the light guide plate, and light having one wavelength emitted from at least one of the pixels satisfies the condition that $2t \cdot \sin \theta - 2 \leq W_Y \leq 2t \cdot \sin \theta + 2$, preferably, $2t \cdot \sin \theta - 1 \leq W_Y \leq 2t \cdot \sin \theta + 1$, and more preferably, $W_Y = 2t \cdot \sin \theta$, where the axial direction of the light guide plate is the Y-direction, the normal direction of the light guide plate is the X-direction, $W_Y$ (unit: mm) represents the width in the Y-direction of the light beam incident on the light guide plate, t (unit: mm) represents the thickness of the light guide plate, and $\theta$ represents the incident angle of the light, which is totally reflected in the light guide plate, on an inner surface of the light guide plate.

Alternatively, the first deflecting means and the second deflecting means may be provided on a surface of the light guide plate, and the condition that $2t \cdot \tan \theta - 2 \leq W_Y \leq 2t \cdot \tan \theta + 2$, preferably, $2t \cdot \tan \theta - 1 \leq W_Y \leq 2t \cdot \tan \theta + 1$, and more preferably, $W_Y = 2t \cdot \tan \theta$ may be satisfied, where the axial direction of the light guide plate is the Y-direction, the normal direction of the light guide plate is the X-direction, $W_Y$ (unit: mm) represents the width in the Y-direction of the light beam incident on the light guide plate, t (unit: mm) represents the thickness of the light guide plate, and $\theta$ represents the incident angle of the light, which is totally reflected in the light guide plate, on an inner surface of the light guide plate.

An image display apparatus according to another embodiment includes:

(A) a light source;

(B) a collimating optical system configured to convert light emitted from the light source into parallel light;

(C) scanning means configured to scan the parallel light emitted from the collimating optical system;

(D) a relay optical system configured to relay the parallel light scanned by the scanning means; and (E) an optical device on which the parallel light from the relay optical system is incident, in which the parallel light is guided, and from which the parallel light is emitted.

The optical device includes:

(a) a light guide plate from which the incident light is emitted after propagating in the light guide plate by total reflection;

(b) first deflecting means configured to deflect the light incident on the light guide plate so that the incident light is totally reflected in the light guide plate; and (c) second deflecting means configured to deflect the light, which propagates in the light guide plate by total reflection, a plurality of times so as to emit the light from the light guide plate.

In the image display apparatus of the embodiment, the first deflecting means and the second deflecting means are provided in the light guide plate, and light having one wavelength emitted from at least one of the pixels satisfies the condition that $2t \cdot \sin \theta - 2 \leq W_Y \leq 2t \cdot \sin \theta + 2$, preferably, $2t \cdot \sin \theta - 1 \leq W_Y \leq 2t \cdot \sin \theta + 1$, and more preferably, $W_Y = 2t \cdot \sin \theta$, where the axial direction of the light guide plate is the Y-direction, the normal direction of the light guide plate is the X-direction, $W_Y$ (unit: mm) represents the width in the Y-direction of the light beam incident on the light guide plate, t (unit: mm) represents the thickness of the light guide plate, and $\theta$ represents the incident angle of the light, which is totally reflected in the light guide plate, on an inner surface of the light guide plate.

Alternatively, the first deflecting means and the second deflecting means may be provided on a surface of the light guide plate, and the condition that $2t \cdot \tan \theta - 2 \leq W_Y \leq 2t \cdot \tan \theta + 2$, preferably, $2t \cdot \tan \theta - 1 \leq W_Y \leq 2t \cdot \tan \theta + 1$, and more preferably, $W_Y = 2t \cdot \tan \theta$ may be satisfied, where the axial direction of the light guide plate is the Y-direction, the normal direction of the light guide plate is the X-direction, $W_Y$ (unit: mm) represents the width in the Y-direction of the light beam incident on the light guide plate, t (unit: mm) represents the thickness of the light guide plate, and $\theta$ represents the incident angle of the light, which is totally reflected in the light guide plate, on an inner surface of the light guide plate.

In the image display apparatuses according to the above embodiments, the first deflecting means can reflect the light incident on the light guide plate, and the second deflecting means can transmit and reflect the light, which propagates in the light guide plate by total reflection, a plurality of times. In this cases, the first deflecting means can function as a reflecting mirror, and the second deflecting means can function as a semi-transmissive mirror.

The first deflecting means may diffract the light incident on the light guide plate, and the second deflecting means may diffract the light, which propagates in the light guide plate by total reflection, a plurality of times. In this case, the first deflecting means and the second deflecting means can be formed by diffraction grating elements. The diffraction grating elements can be reflective diffraction grating elements, or transmissive diffraction grating elements. Alternatively, one of the diffraction grating elements can be a reflective diffraction grating element, and the other diffraction grating element can be a transmissive diffraction grating element. In these cases, the following condition is satisfied:

$$2t \cdot \tan \theta - 2 \leq L_h - 1 \leq 2t \cdot \tan \theta + 2$$

where $L_h - 1$ (unit: mm) represents the effective length of the first deflecting means in the Y-direction.

In the image display apparatuses according to the above embodiments, the condition that $2t \cdot \sin \theta - 2 \leq W_Y \leq 2t \cdot \sin \theta + 2$ or the condition that $2t \cdot \tan \theta - 2 \leq W_Y \leq 2t \cdot \tan \theta + 2$ is satisfied. For this reason, even if the position of the eye of the observer moves, brightness unevenness and color unevenness are rarely observed in a two-dimensional image formed by the image forming device and so on.

Additional features and advantages are described herein, and will be apparent from the following Detailed Description and the figures.

DETAILED DESCRIPTION

Figure 1:
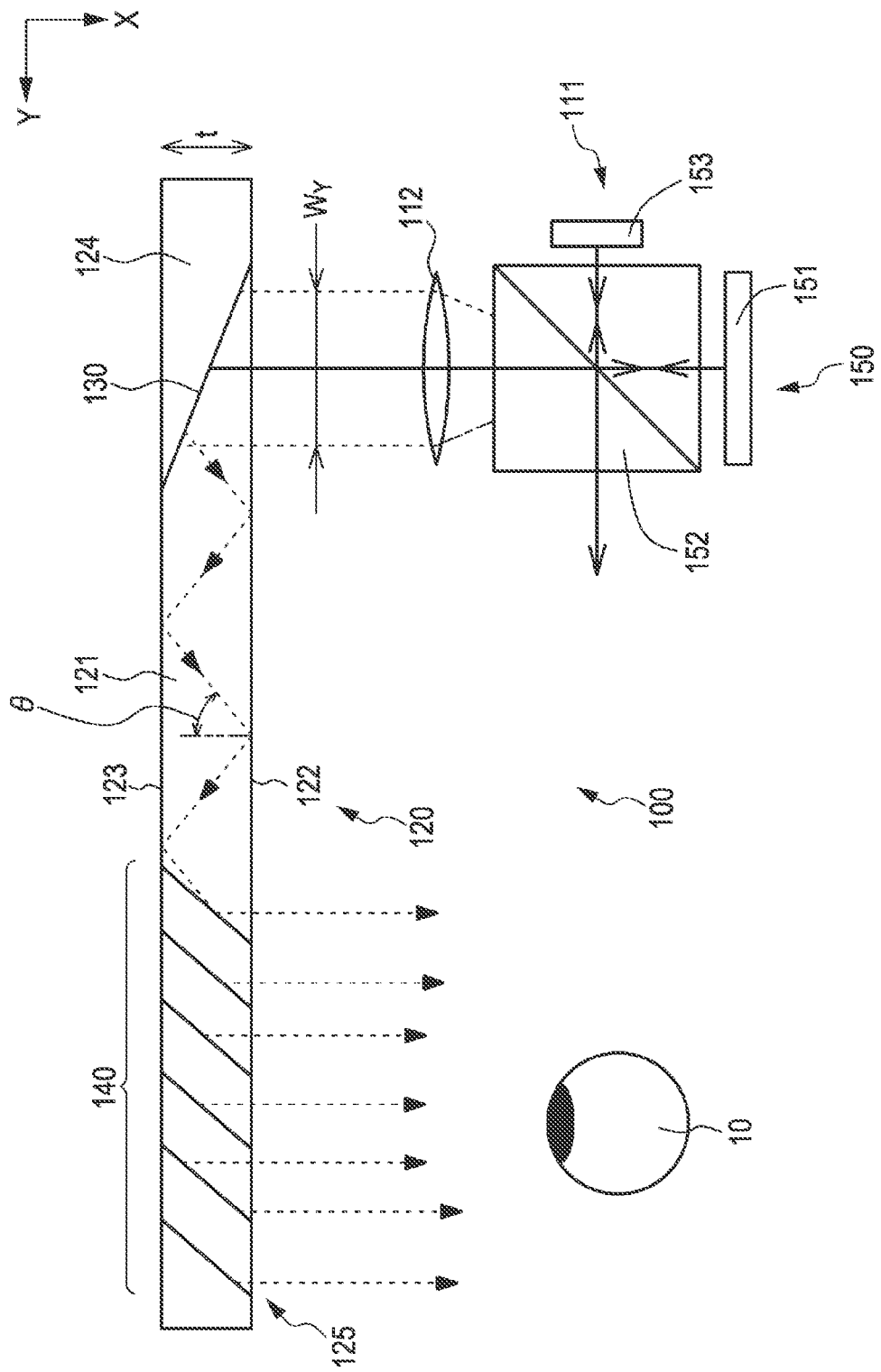
FIG. 1 is a conceptual view of an image display apparatus according to Embodiment 1.

The present application will be described in detail below with reference to the drawings according to an embodiment.

In an image display apparatus according to an embodiment, an image generating device can include a reflective spatial light modulator and a light source, include a transmissive spatial light modulator and a light source, or include a light emitting element such as an organic EL (Electro Luminescence) element, an inorganic EL element, or a light emitting diode (LED). Especially, it is preferable that the image forming device include a reflective spatial light modulator and a light source. For example, the spatial light modulator can be formed by a light valve, a transmissive or reflective liquid crystal display such as an LCOS (Liquid Crystal On Silicon), or a digital micromirror device (DMD), and the light source can be formed by a light emitting element. Further, the reflective spatial light modulator can include a liquid crystal display, and a polarizing beam splitter that reflects part of light from the light source to the liquid crystal display and transmits part of the light reflected by the liquid crystal display to a collimating optical system. The light emitting element that forms the light source includes, for example, a red light emitting element, a green light emitting element, a blue light emitting element, and a white light emitting element. The light emitting element can be formed by a semiconductor laser element or an LED. The number of pixels can be determined according to the specifications of the image display apparatus. For example, a concrete number of pixels is 320×240, 432×240, 640×480, 1024×768, or 1920×1080.

In an image display apparatus according to another embodiment, a light source can be formed by, for example, a light emitting element. More specifically, the light emitting element can include a red light emitting element, a green light emitting element, a blue light emitting element, and a white light emitting element. For example, the light emitting element can be formed by a semiconductor laser element or an LED. The number of pixels (virtual pixels) in the image display apparatus of this embodiment can be determined according to the specifications of the image display apparatus. For example, a concrete number of pixels (virtual pixels) is 320×240, 432×240, 640×480, 1024×768, or 1920×1080. When the light source includes a red light emitting element, a green light emitting element, and a blue light emitting element, for example, it is preferable to perform color synthesis using a crossed prism. A scanning member can be formed by a MEMS (Micro Electro Mechanical System) having a micromirror rotatable in the two-dimensional direction, or a galvanometer mirror, which scans light emitted from the light source horizontally and vertically. A relay optical system can be formed by a relay optical system of the related art.

Besides the image forming device including a light emitting element and a light valve, or the image forming device including, as a light source, a combination of a backlight for emitting white light as a whole and a liquid crystal display having red, green, and blue light emitting pixels, the following structures can be given as examples.

Image Forming Device A

An image forming device A includes:

(a) a first image forming unit formed by a first light emitting panel in which first light emitting elements for emitting blue light are arranged in a two-dimensional matrix;

(b) a second image forming unit formed by a second light emitting panel in which second light emitting elements for emitting green light are arranged in a two-dimensional matrix;

(c) a third image forming unit formed by a third light emitting panel in which third light emitting elements for emitting red light are arranged in a two-dimensional matrix; and (d) a combining unit that combines the optical paths of light emitted from the first, second, and third image forming units into one optical path (e.g., a dichroic prism, this also applies to the following description).

The image forming device A controls a light-emitting/non-light-emitting state of each of the first, second, and third light emitting elements.

Image Forming Device B

An image forming device B includes:

(a) a first image forming unit including a first light emitting element for emitting blue light, and a first light transmission control unit for controlling transmission/non-transmission of the blue light emitted from the first light emitting element (the first light transmission control unit is a kind of light valve, and includes, for example, a liquid crystal display, a digital micromirror device (DMD), and an LCOS, this also applies to the following description);

(b) a second image forming unit including a second light emitting element for emitting green light, and a second light transmission control unit (light valve) for controlling transmission/non-transmission of the green light emitted from the second light emitting element;

(c) a third image forming unit including a third light emitting element for emitting red light, and a third light transmission control unit (light valve) for controlling transmission/non-transmission of the red light emitted from the third light emitting element; and (d) a combining unit that combines the optical paths of light passing through the first, second, and third light transmission control units into one optical path.

The image forming device B displays an image by controlling transmission/non-transmission of the light emitted from the light emitting elements by the light transmission control units. As devices (light guide members) for guiding the light emitted from the first, second, and third light emitting elements to the light transmission control units, for example, optical waveguides, microlens arrays, mirrors, reflective plates, or light-collecting lenses can be used.

Image Forming Device C

An image forming device C includes:

(a) a first image forming unit including a first light emitting panel in which first light emitting elements for emitting blue light are arranged in a two-dimensional matrix, and a blue light transmission control unit (light valve) that controls transmission/non-transmission of the blue light emitted from the first light emitting panel;

(b) a second image forming unit including a second light emitting panel in which second light emitting elements for emitting green light are arranged in a two-dimensional matrix, and a green light transmission control unit (light valve) that controls transmission/non-transmission of the green light emitted from the second light emitting panel;

(c) a third image forming unit including a third light emitting panel in which third light emitting elements for emitting red light are arranged in a two-dimensional matrix, and a red light transmission control unit (light valve) that controls transmission/non-transmission of the red light emitted from the third light emitting panel; and (d) a combining unit that combines the optical paths of the light passing through the blue, green, and red light transmission control units into one optical path.

The image forming device C displays an image by controlling transmission/non-transmission of the light emitted from the first, second, and third light emitting panels by the light transmission control units (light valves).

Image Forming Device D

An image forming device D is a color-display image forming device of a field sequential type. The image forming device D includes:

(a) a first image forming unit including a first light emitting element for emitting blue light;

(b) a second image forming unit including a second light emitting element for emitting green light;

(c) a third image forming unit including a third light emitting element for emitting red light;

(d) a combining unit that combines the optical paths of the light emitted from the first, second, third image forming units into one optical path; and (e) a light transmission control unit (light valve) that controls transmission/non-transmission of the light emitted from the combining unit.

The image forming device D displays an image by controlling transmission/non-transmission of the light emitted from these light emitting elements by the light transmission control unit.

Image Forming Device E

An image forming device E is also a color display image forming device of a field sequential type. The image forming device E includes:

(a) a first image forming unit including a first light emitting panel in which first light emitting elements for emitting blue light are arranged in a two-dimensional matrix;

(b) a second image forming unit including a second light emitting panel in which second light emitting elements for emitting green light are arranged in a two-dimensional matrix;

(c) a third image forming unit including a third light emitting panel in which third light emitting elements for emitting red light are arranged in a two-dimensional matrix;

(d) a combining unit that combines the optical paths of the light emitted from the first, second, third image forming units into one optical path; and (e) a light transmission control unit (light valve) that controls transmission/non-transmission of the light emitted from the combining unit.

The image forming device E displays an image by controlling transmission/non-transmission of the light emitted from these light emitting panels by the light transmission control unit.

Image Forming Device F

An image forming device F is a color-display image forming device of a passive or active matrix type that displays an image by controlling light-emitting/non-light-emitting states of first, second, and third light emitting elements.

Image Forming Device G

An image forming device G is a color-display image forming device of a field sequential type. The image forming device G includes a light transmission control unit (light valve) that controls transmission/non-transmission of light emitted from light emitting element units arranged in a two-dimensional matrix. The image forming device G displays an image by controlling light-emitting/non-light-emitting states of first, second, and third light emitting elements in the light emitting element units in a time division manner, and by controlling transmission/non-transmission of light emitted from the first, second, and third light emitting elements by the light transmission control unit.

In the image display apparatus according to the above embodiment, as described above, the first deflecting member functions as a reflecting mirror, and the second deflecting member functions as a semi-transmissive mirror. In this configuration, the first deflecting member can be formed, for example, by a light reflecting film (a kind of mirror) made of metal including an alloy and configured to reflect the light incident on the light guide plate, or a diffraction grating (e.g., a hologram diffraction grating film) for diffracting the light incident on the light guide plate. The second deflecting member can be formed by a multilayer structure in which multiple dielectric films are stacked, a half mirror, a polarizing beam splitter, or a hologram diffraction grating film.

In the image display apparatus according to an embodiment, the first deflecting member and the second deflecting member are provided (incorporated) in the light guide plate. The first deflecting member reflects or diffracts parallel light incident on the light guide plate so that the incident parallel light is totally reflected in the light guide plate. In contrast, the second deflecting member reflects or diffracts the parallel light, which propagates in the light guide plate by total reflection, a plurality of times, and emits the parallel light from the light guide plate.

In the image display apparatus according to an embodiment, as described above, each of the first deflecting member and the second deflecting member is preferably formed by a reflective diffraction grating element, more preferably, a reflective volume hologram diffraction grating. For convenience, the first deflecting member formed by a reflective volume hologram diffraction grating is sometimes referred to as a "first diffraction grating member", and the second deflecting member formed by a reflective volume hologram diffraction grating is sometimes referred to as a "second diffraction grating member".

To diffract or reflect a P-number of (e.g., three corresponding to red, green, and blue) types of light beams having a P-number of different wavelength bands (or wavelengths), in the first diffraction grating member or the second diffraction grating member, a P-number of diffraction grating layers, each formed by a reflective volume hologram diffraction grating, can be stacked. Each diffraction grating layer is provided with interference fringes corresponding to one wavelength band (or wavelength). Alternatively, to diffract or reflect a P-number of types of light beams having a P-number of different wavelength bands (or wavelengths), the first diffraction grating member or the second diffraction grating member can be formed by one diffraction grating layer that is provided with a P-number of types of interference fringes. Further alternatively, for example, the angle of view can be divided into three parts, and the first diffraction grating member or the second diffraction grating member can be formed by stacking diffraction grating layers corresponding to the parts of the angle of view. By adopting these structures, it is possible to increase the diffraction efficiency and acceptable diffraction angle and to optimize the diffraction angle when the light beams having the wavelength bands (or wavelengths) are diffracted or reflected by the first diffraction grating member or the second diffraction grating member.

For example, the first diffraction grating member and the second diffraction grating member can be formed of a photopolymer material. The material and basic structure of the first diffraction grating member and the second diffraction grating member formed by the reflective volume hologram diffraction gratings may be the same as those of the reflective volume hologram diffraction gratings of the related art. Here, the reflective volume hologram diffraction grating refers to a hologram diffraction grating that diffracts and reflects only +1-order diffracted light. While the diffraction grating member is provided with interference fringes extending from the inner side to the outer side of the diffraction grating member, a formation method for the interference fringes may be the same as that adopted in the related art. More specifically, for example, the material that forms the diffraction grating member (e.g., a photopolymer material) is irradiated with object light in a first predetermined direction, and is simultaneously irradiated with reference light in a second predetermined direction, whereby the object light and the reference light form interference fringes in the material that forms the diffraction grating member. By appropriately selecting the first predetermined direction, the second predetermined direction, and the wavelengths of the object light and the reference light, the interference fringes can be arranged at a desired pitch with a desired slant angle on the surfaces of the diffraction grating member. Here, the slant angle of the interference fringes refers to the angle formed between the surfaces of the diffraction grating member (or the diffraction grating layer) and the interference fringes. When the first diffraction grating member and the second diffraction grating member are formed to have a layered structure in which a P-number of diffraction grating layers, each formed by a reflective volume hologram diffraction grating, are stacked, a P-number of diffraction grating layers are separately formed, and are then stacked (bonded) with, for example, an ultraviolet curing resin adhesive. Alternatively, a P-number of diffraction grating layers may be formed by forming one diffraction grating layer of an adhesive photopolymer material, and then bonding layers of an adhesive photopolymer material thereon in order.

In the image display apparatus according to the above-described embodiments, a plurality of parallel light beams collimated by the collimating optical system are caused to enter the light guide plate. The reason why the light beams are to be parallel light beams is based on the fact that wavefront information obtained when the light beams enter the light guide plate is stored even after the light beams are emitted from the light guide plate via the first deflecting member and the second deflecting member. To generate a plurality of parallel light beams, for example, the image forming device is placed at a position corresponding to the focal length of the collimating optical system. Here, the collimating optical system serves to convert positional information of the pixels into the angular information of the optical system of the optical device.

In the image display apparatuses according to an embodiments, the light guide plate has two parallel surfaces (first and second surfaces) extending parallel to the axis (Y-direction) of the light guide plate. Assuming that a surface of the light guide plate on which light is incident is an incident surface and a surface of the light guide plate from which light is emitted is an exit surface, both the incident surface and the exit surface may be defined by the first surface, or the incident surface may be defined by the first surface and the exit surface may be defined by the second surface.

For example, the light guide plate can be formed of a glass material including optical glass such as quartz glass or BK7, or a plastic material (e.g., PMMA, polycarbonate resin, acrylic resin, amorphous polypropylene resin, or styrene resin including AS resin). The light guide plate is not limited to a flat plate, and may be curved.

For example, the collimating optical system can be formed by an optical system which has a positive optical power as a whole and which includes a convex lens, a concave lens, an adjustable surface prism, or a hologram lens alone or a combination of these.

For example, a lighter and smaller HMD can be formed using the image display apparatus according to any of the embodiments. In this case, discomfort of the observer wearing the HMD can be greatly decreased, and the production cost can be reduced.

Embodiment 1

FIG. 1 is a conceptual view of an image display apparatus 100 according to Embodiment 1 or an image display apparatus 300 according to Embodiment 3 that will be described below. Referring to FIG. 1, the image display apparatus 100 or 300 includes:

(A) an image forming device 111 including a plurality of pixels arranged in a two-dimensional matrix;

(B) a collimating optical system 112 that converts light emitted from the pixels in the image forming device 111 into parallel light; and (C) an optical device 120 or 320 on which the parallel light from the collimating optical system 112 is incident, in which the parallel light is guided, and from which the parallel light is emitted.

In Embodiment 1, the optical device 120 includes:

(a) a light guide plate 121 from which incident light is emitted after propagating in the light guide plate 121 by total reflection;

(b) a first deflecting member 130 that deflects the light incident on the light guide plate 121 so that the incident light is totally reflected in the light guide plate 121; and (c) a second deflecting member 140 that deflects the light, which propagates in the light guide plate 121 by total reflection, a plurality of times so as to emit the light from the light guide plate 121.

The first deflecting member 130 and the second deflecting member 140 are provided in the light guide plate 121. The first deflecting member 130 reflects light incident on the light guide plate 121, and the second deflecting member 140 transmits and reflects the light, which propagates in the light guide plate 121 by total reflection, a plurality of times. In other words, the first deflecting member 130 functions as a reflecting mirror, and the second deflecting member 140 functions as a semi-transmissive mirror. More specifically, the first deflecting member 130 provided in the light guide plate 121 is formed by a light reflecting film (a kind of mirror) made of aluminum and configured to reflect light incident on the light guide plate 121. In contrast, the second deflecting member 140 provided in the light guide plate 121 is formed by a layered structure in which multiple dielectric films are stacked. The dielectric films include, for example, a $TiO_2$ film made of a high dielectric constant material and a $SiO_2$ film made of a low dielectric constant material. The layered structure in which multiple dielectric films are stacked is disclosed in Japanese Unexamined Patent Application Publication (Translation of PCT Application) No. 2005-521099. While six dielectric films are shown in the figure, the number of dielectric films is not limited thereto. Thin pieces made of the same material as that of the light guide plate 121 are provided between the dielectric films. The first deflecting member 130 reflects (or diffracts) parallel light incident on the light guide plate 121 so that the incident light is totally reflected in the light guide plate 121. In contrast, the second deflecting member 140 reflects (or diffracts) the parallel light, which propagates in the light guide plate 121 by total reflection, a plurality of times, and emits the parallel light from the light guide plate 121.

An inclined surface where the first deflecting member 130 is to be formed is formed in the light guide plate 121 by cutting out a portion 124 of the light guide plate 121, a light reflective film is formed on the inclined surface by vacuum deposition, and the cut portion 124 of the light guide plate 121 is then bonded to the first deflecting member 130. Further, a layered structure, in which multiple layers made of the same material (e.g., glass) as that of the light guide plate 121 and multiple dielectric films (for example, formed by vacuum deposition) are stacked, is formed, an inclined surface is formed by cutting out a portion 125 of the light guide plate 121 where the second deflecting member 140 is to be formed, the layered structure is bonded to the inclined surface, and the outer side of the light guide plate 121 of the second deflecting member 140 is shaped by, for example, polishing. Thus, the light guide device 120 in which the first deflecting member 130 and the second deflecting member 140 are provided can be obtained.

In Embodiment 1 or Embodiment 3 described below, the image forming device 111 includes a reflective spatial light modulator 150 and a light source 153 formed by a light emitting diode for emitting white light. More specifically, the reflective spatial light modulator 150 includes a liquid crystal display (LCD) 151 formed by an LCOS serving as a light valve, and a polarizing beam splitter 152 that reflects part of light from the light source 153 to the liquid crystal display 151 and transmits part of the light reflected by the liquid crystal display 151 so as to guide the reflected part to the collimating optical system 112. The liquid crystal display 151 includes a plurality of (e.g., 320×240) pixels (liquid crystal cells) arranged in a two-dimensional matrix. The polarizing beam splitter 152 has the same structure as that of the related art. Unpolarized light emitted from the light source 153 impinges on the polarizing beam splitter 152. P-polarized light components pass through the polarizing beam splitter 152, and are emitted therefrom. In contrast, S-polarized light components are reflected by the polarizing beam splitter 152, enter the liquid crystal display 151, are reflected by the inner side of the liquid crystal display 151, and are then emitted from the liquid crystal display 151. Here, light emitted from pixels for displaying white, of light emitted from the liquid crystal display 151, contains many P-polarized light components, and light emitted from pixels for displaying black contains many S-polarized light components. Therefore, P-polarized light components, of the light that is emitted from the liquid crystal display 151 and impinges on the polarizing beam splitter 152, pass through the polarizing beam splitter 152, and are guided to the collimating optical system 112. In contrast, S-polarized light components are reflected by the polarizing beam splitter 152, and return to the light source 153. The liquid crystal display 151 includes a plurality of (e.g., 320×240) pixels (the number of liquid crystal cells is three times the number of pixels) arranged in a two-dimensional matrix. The collimating optical system 112 is formed by, for example, a convex lens. To generate parallel light, the image forming device 111 (concretely, the liquid crystal display 151) is placed at a position corresponding to the focal length of the collimating optical system 112. One pixel is defined by a red light emitting sub-pixel for emitting red light, a green light emitting sub-pixel for emitting green light, and a blue light emitting sub-pixel for emitting blue light.

In Embodiment 1 or Embodiments 2 to 4 described below, the light guide plate 121 or 321 made of optical glass or a plastic material has two parallel surfaces (first surface 122 or 322 and second surface 123 or 323) extending parallel to the axis of the light guide plate 121 or 321. The first surface 122 or 322 faces the second surface 123 or 323. Parallel light enters from the first surface 122 or 322 serving as a light incident surface, propagates in the light guide plate 121 or 321 by total reflection, and is emitted from the first surface 122 or 322 also serving as a light exit surface. Alternatively, the light incident surface may be defined by the second surface 123 or 323, and the light exit surface may be defined by the first surface 122 or 322.

In Embodiment 1 or Embodiments 2 to 4 described below, the axial direction of the light guide plate 121 or 321 is the Y-direction, the normal direction of the light guide plate 121 or 321 is the X-direction, $W_y$ (unit: mm) represents the width in the Y-direction of a light beam incident on the light guide plate 121 or 321 (that is, the exit pupil diameter of the collimating optical system in Embodiment 1 or 3, the exit pupil diameter of the relay optical system in Embodiment 2 or 4), t (unit: mm) represents the thickness of the light guide plate 121 or 321, and θ represents the incident angle of light, which is totally reflected in the light guide plate 121 or 321, on the inner surface of the light guide plate.

In Embodiment 1, light having one wavelength emitted from at least one pixel satisfies the following condition:

$$2t \cdot \sin\theta - 2 \leq W_y \leq 2t \cdot \sin\theta + 2 \qquad (1)$$

Figure 2:
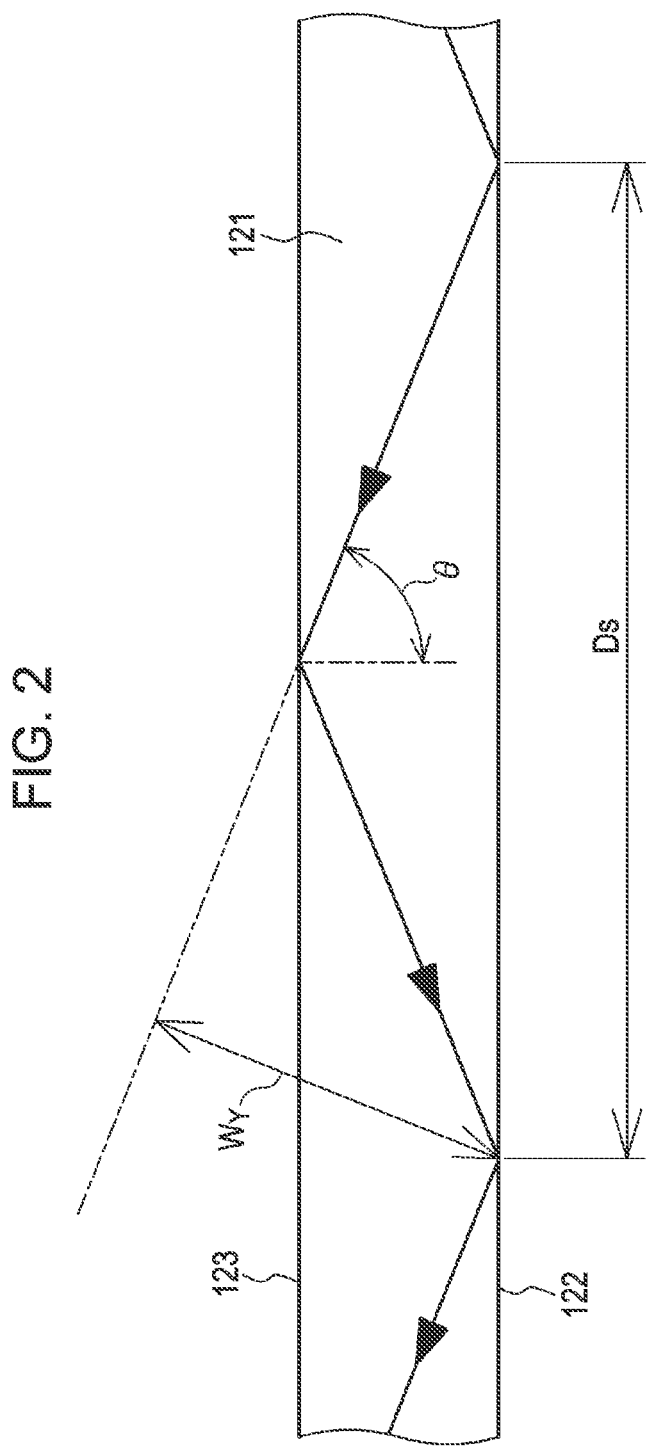
FIG. 2 is a conceptual view showing a state in which light propagates in a light guide plate in the image display apparatus of Embodiment 1 or an image display apparatus of Embodiment 2.
Figure 13:
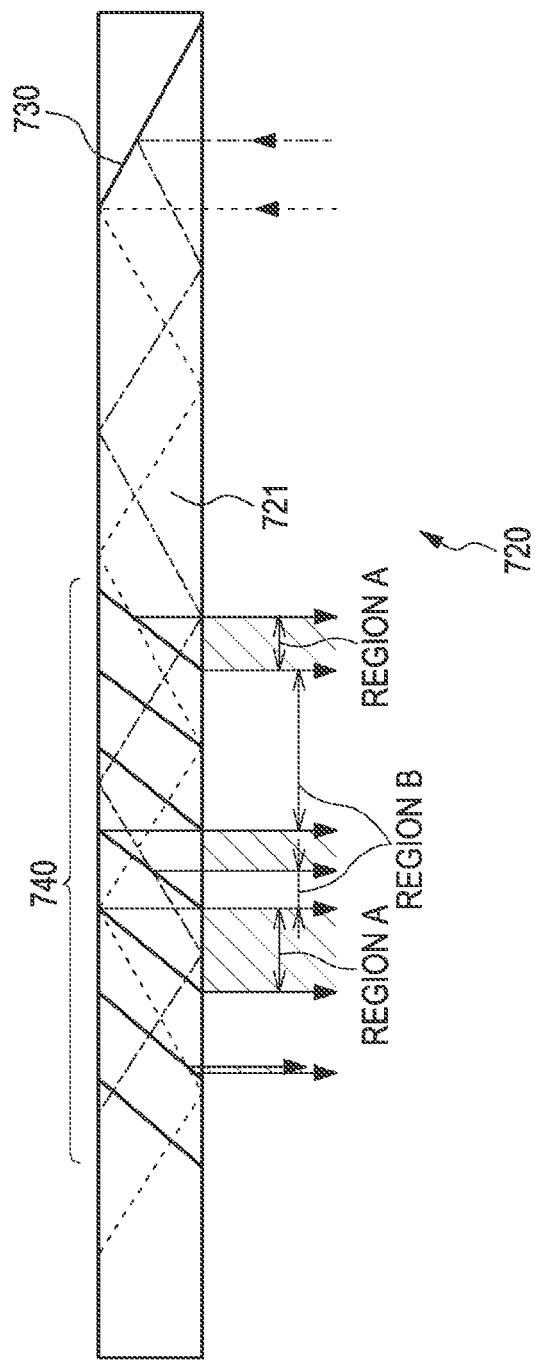
FIG. 13 is a conceptual view illustrating a problem of an image display apparatus of a first type in the related art.

Referring to FIG. 2 serving as a conceptual view, a light beam incident on the light guide plate 121 and having a width $W_Y$ in the Y-direction is reflected by the first deflecting member (light reflecting film) 130, and propagates in the light guide plate 121 while being totally reflected. In this case, by setting the parameters, such as the width $W_Y$ in the Y-direction of the light beam incident on the light guide plate, the thickness t of the light guide plate, and the incident angle θ of the light beam, which is totally reflected in the light guide plate, on the inner surface of the light guide plate, so as to satisfy the condition that the propagating light beam does not overlap and fills the light guide plate 121 with no space, the phenomenon, which has been described with reference to FIG. 13, does not occur.

While the light beam having the width $W_Y$ in the Y-direction repeats total reflection in the light guide plate 121, the width of the light beam does not vary, but is fixed at $W_Y$. Assuming that Ds (unit: mm) represents the distance by which the light travels while the light is totally reflected by the inner surface of the first surface 122 of the light guide plate 121, is totally reflected by the inner surface of the second surface 123, and is totally reflected again by the inner surface of the first surface 122, the above condition is satisfied when $W_Y$ and Ds have the relationship given by the following Expression (3), as shown in FIG. 2 serving as the conceptual view. Further, t, θ, and Ds have the relationship given by the following Expression (4). Expression (5) is derived from Expressions (3) and (4):

$$Ds = W_Y/\cos\theta \quad (3)$$

$$Ds = 2t \cdot \tan\theta \quad (4)$$

$$W_Y = 2t \cdot \sin\theta \quad (5)$$

Therefore, when Expression (5) is satisfied, the light beam propagating in the light guide plate 121 by total reflection does not overlap in the light guide plate 121, and fills the light guide plate 121 with no space. Thus, even if the eye 10 of the observer moves in the Y-direction, the phenomenon shown in FIG. 13 does not occur, and the image brightness does not change rapidly. In other words, regardless of the region where the eye 10 of the observer is, light emitted from the collimating optical system 112 finally reaches the eye 10, and brightness unevenness and color unevenness are rarely caused because of the position of the eye of the observer in the image displayed by the image display apparatus 100. For this reason, it is possible to provide an image display apparatus that achieves a high display quality.

It is known that the brightness of light felt by the eyes of the observer is proportional to the logarithm (log(A)) of the luminance A, and that the observer is not sensitive to the brightness change particularly when viewing a bright object such as a display. Further, the human pupil diameter is normally about 4 mm when viewing a bright object such as a display. Therefore, it is known through experiments that the observer does not visually recognize a great brightness change even when there is a gap of about 2 mm in the Y-direction between light beams emitted from the light guide plate, or even when there is an overlapping portion of about 2 mm between the light beams. Hence, the equal sign in Expression (5) can be increased to the range in Expression (1).

An image display apparatus including an optical device that satisfied the upper and lower limits in Expression (1) was actually produced by way of trial, and image displayed by the image display apparatus were observed. As a result of observation, it was not found that brightness unevenness and color unevenness were caused in the display images because of the positions of the eyes of the observer.

Embodiment 2

Figure 3:
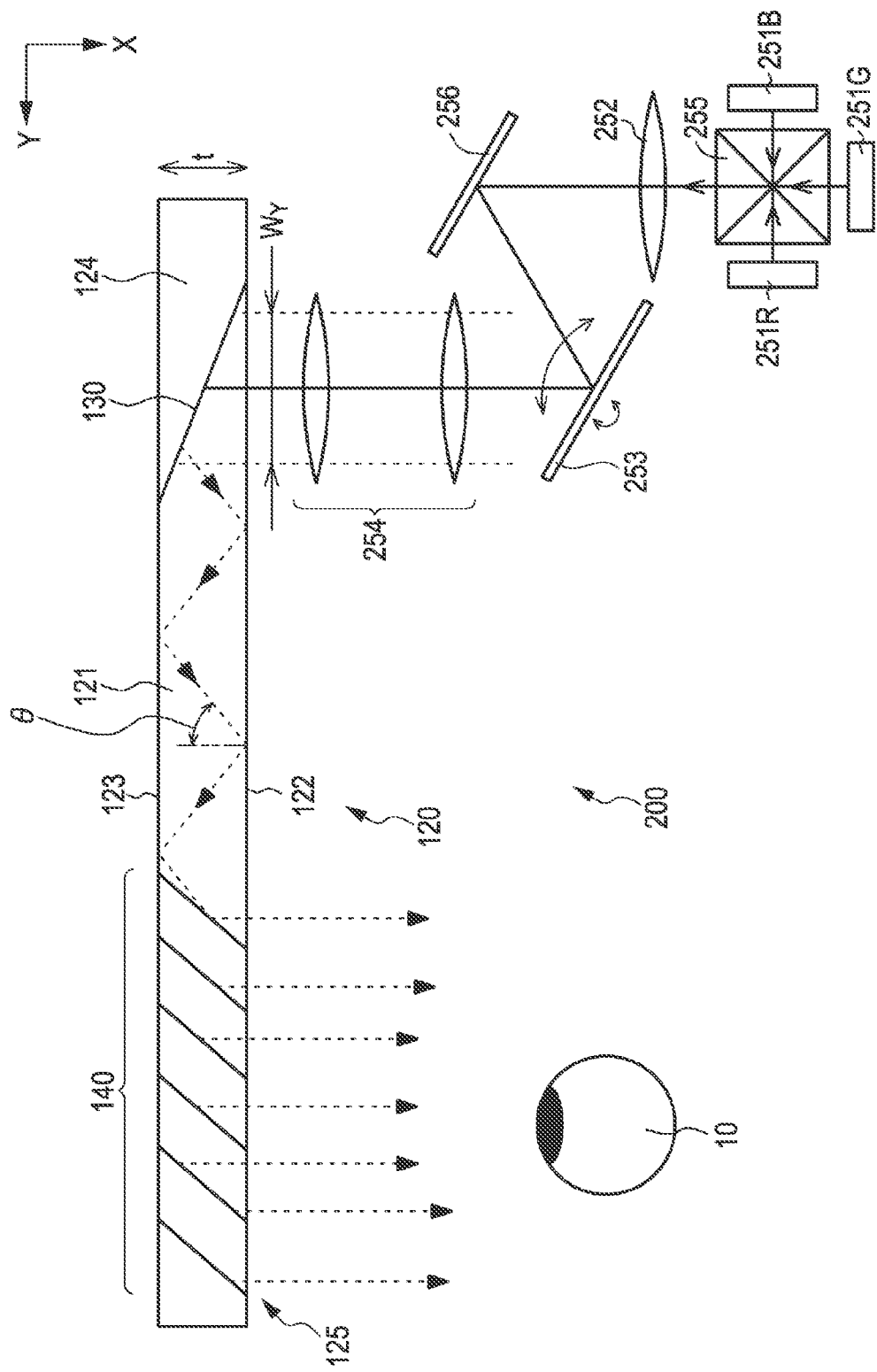
FIG. 3 is a conceptual view of the image display apparatus of Embodiment 2.

FIG. 3 is a conceptual view of an image display apparatus 200 according to Embodiment 2 or an image display apparatus 400 according to Embodiment 4 described below. Referring to FIG. 3, the image display apparatus 200 or 400 includes:

(A) a light source 251;

(B) a collimating optical system 252 that converts light emitted from the light source 251 into parallel light;

(C) a scanning member 253 that scans the parallel light emitted from the collimating optical system 252;

(D) a relay optical system 254 that relays the parallel light scanned by the scanning member 253; and (E) an optical device 120 on which the parallel light from the relay optical system 254 is incident, in which the parallel light is guided, and from which the parallel light is emitted.

The optical device 120 has the same structure as that of the optical device 120 in Embodiment 1, and light incident on the optical device 120 behaves in a manner similar to that adopted in Embodiment 1 and satisfies Expression (1). Therefore, detailed descriptions thereof are omitted.

The light source 251 includes a red light emitting element 251R for emitting red light, a green light emitting element 251G for emitting green light, and a blue light emitting element 251B for emitting blue light. Each of the light emitting elements is formed by a semiconductor laser element. Light beams of three primary colors emitted from the light source 251 pass through a crossed prism 255, where optical paths thereof are combined into one optical path by color synthesis. The light emitted from the crossed prism 255 enters the collimating optical system 252 having a positive optical power as a whole, and is emitted as parallel light. The parallel light is reflected by a total reflection mirror 256, is horizontally and vertically scanned by the scanning member 253 formed by an MEMS that rotates a micromirror in a two-dimensional direction so as to two-dimensionally scan the incident parallel light, and is converted into a kind of two-dimensional image, whereby virtual pixels are generated. The light from the virtual pixels passes through the relay optical system 254 formed by a relay optical system of the related art, and enters the light guide device 120 as parallel light.

In Embodiment 2, an image display apparatus including an optical device that satisfied the upper and lower limits in Expression (1) was actually produced by way of trial, and images displayed by the image display apparatus were observed. As a result of observation, it was not found that brightness unevenness and color unevenness were caused in the display images because of the positions of the eyes of the observer.

Embodiment 3

Figure 4:
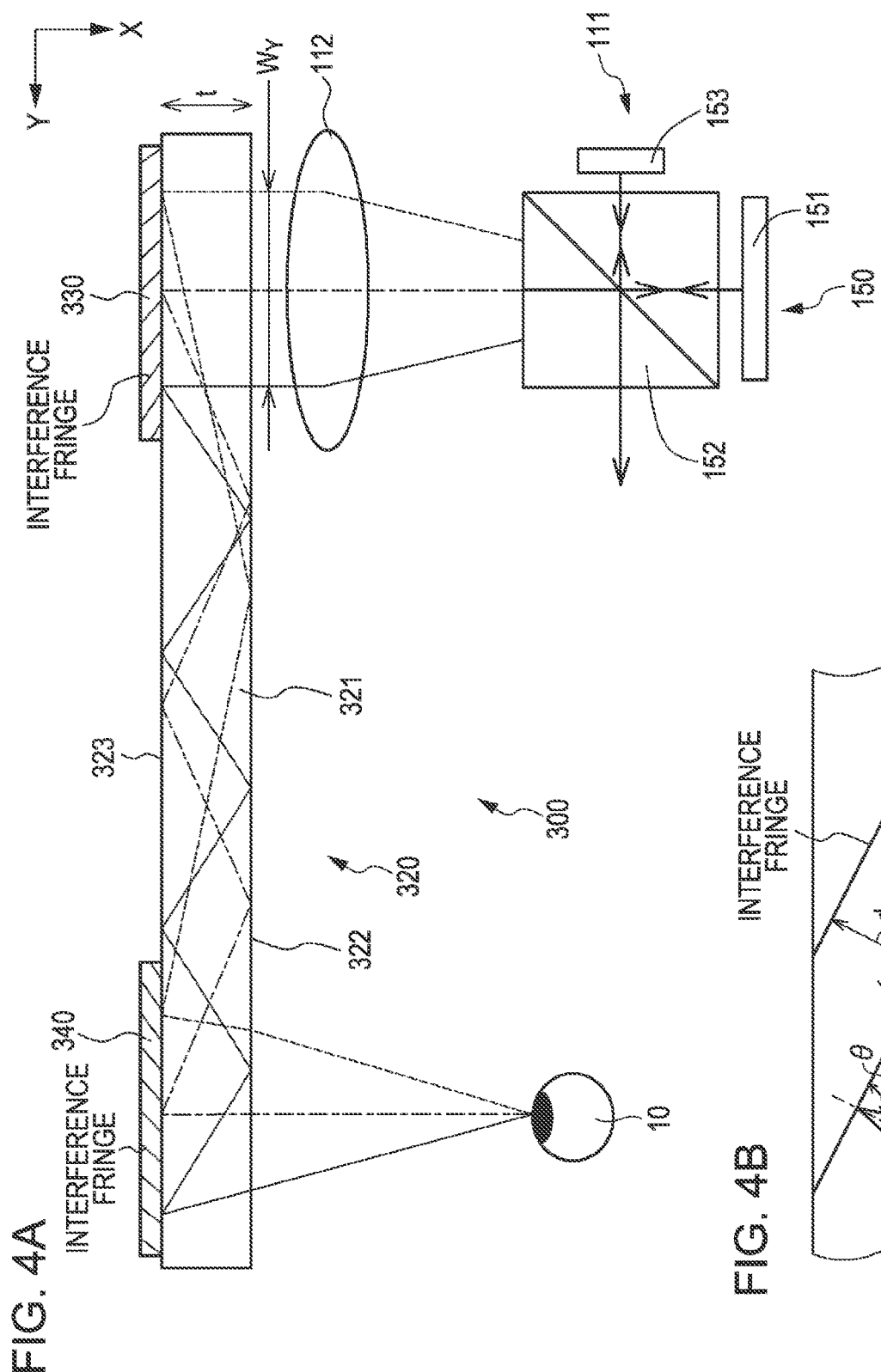
FIG. 4A is a conceptual view of an image display apparatus according to Embodiment 3.
FIG. 4B is an enlarged schematic sectional view of a part of a reflective volume hologram diffraction grating.

FIG. 4A is a conceptual view of an image display apparatus 300 according to Embodiment 3. In the image display apparatus 300 of Embodiment 3, an image forming device 111 and a collimating optical system 112 have the same structures as those of the image forming device 111 and the collimating optical system 112 of Embodiment 1. Further, an optical device 320 has the same basic structure as that of the optical device 120 of Embodiment 1 except in structures of a first deflecting member and a second deflecting member. That is, the optical device 320 includes:

(a) a light guide plate 321 from which incident light is emitted after propagating in the light guide plate 321 by total reflection;

(b) a first deflecting member that deflects the light incident on the light guide plate 321 so that the incident light is totally reflected in the light guide plate 321; and (c) a second deflecting member that deflects the light, which propagates in the light guide plate 321 by total reflection, a plurality of times so as to emit the light from the light guide plate 321.

In Embodiment 3, the first deflecting member and the second deflecting member are provided on a surface of the light guide plate 321 (concretely, a second surface 323 of the light guide plate 321). The first deflecting member diffracts light incident on the light guide plate 321, and the second deflecting member diffracts the light, which propagates in the light guide plate 321 by total reflection, a plurality of times. Each of the first and second deflecting members is formed by a diffraction grating element, specifically, a reflective diffraction grating element, and more specifically, a reflective volume hologram diffraction grating. In the following description, for convenience, the first deflecting member formed by a reflective volume hologram diffraction grating is referred to as a "first diffraction grating member 330", and the second deflecting member formed by a reflective volume hologram diffraction grating is referred to as a "second diffraction grating member 340".

Figure 7:
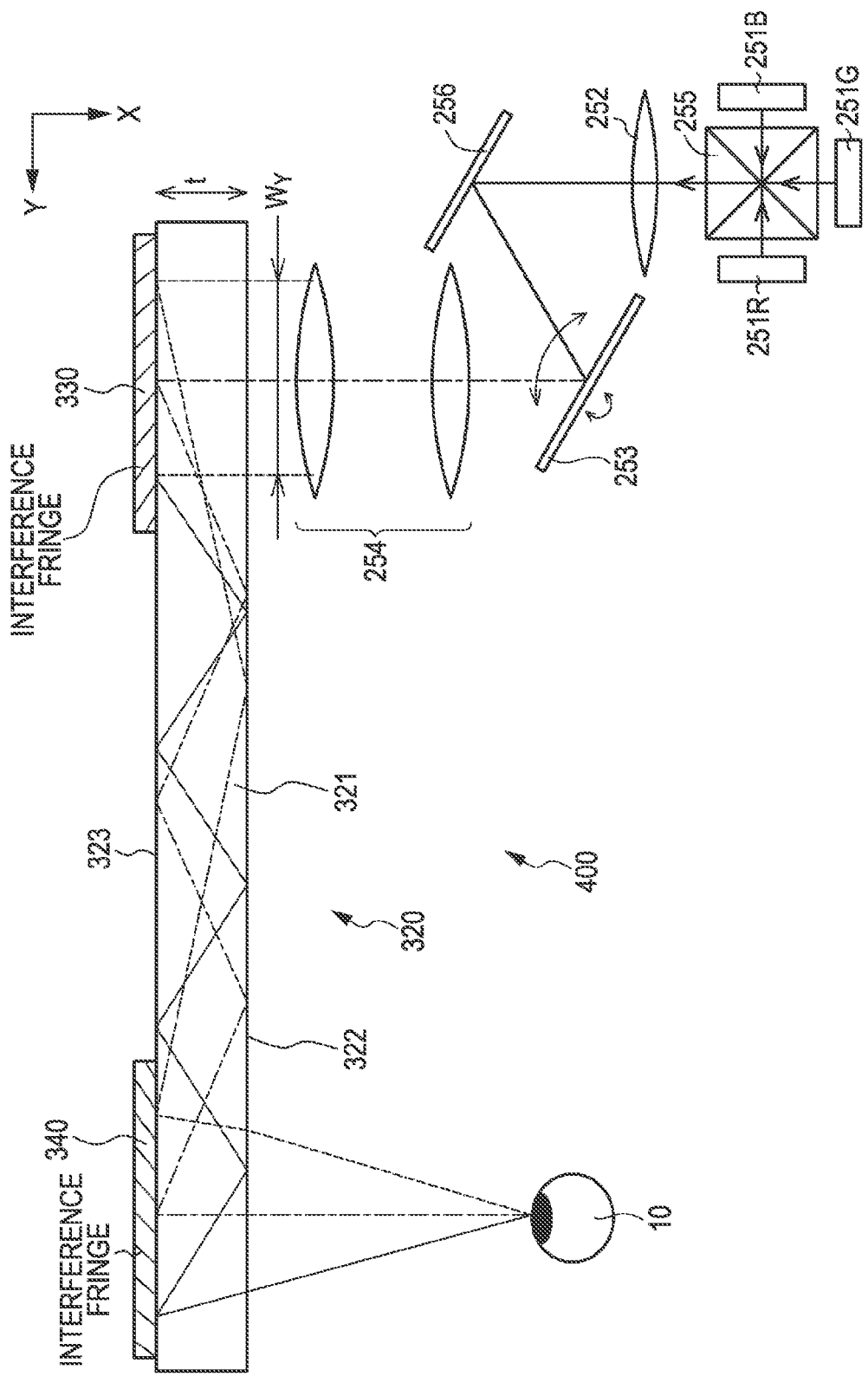
FIG. 7 is a conceptual view of the image display apparatus of Embodiment 4.

In Embodiment 3 or Embodiment 4 described below, in each of the first diffraction grating member 330 and the second diffraction grating member 340, a P-number of diffraction grating layers, each formed by a reflective volume hologram diffraction grating, are stacked to cope with diffraction and reflection of a P-number of types of light beams having a P-number of (concretely, three corresponding to red, green, and blue) different wavelength bands (or wavelengths). Each of the diffraction grating layers is formed of a photopolymer material by the same method as that of the related art, and is provided with interference fringes corresponding to one wavelength band (or wavelength). Specifically, in each of the first diffraction grating member 330 and the second diffraction grating member 340, a diffraction grating layer for diffracting and reflecting red light, a diffraction grating layer for diffracting and reflecting green light, and a diffraction grating layer for diffracting and reflecting blue light are stacked. The interference fringes on the diffraction grating layers (diffraction optical elements) linearly extend at a fixed pitch and parallel to the Z-axis direction. In FIGS. 4A and 7, the first diffraction grating member 330 and the second diffraction grating member 340 are each formed by only one layer. This structure can increase the diffraction efficiency and acceptable diffraction angle and can optimize the diffraction angle when light beams having the wavelength bands (or wavelengths) are diffracted and reflected by the first diffraction grating member 330 and the second diffraction grating members 340.

FIG. 4B is an enlarged schematic partial sectional view of a reflective volume hologram diffraction grating. The reflective volume hologram diffraction grating is provided with interference fringes having a slant angle φ. Here, the slant angle φ refers to the angle formed between the surface of the reflective volume hologram diffraction grating and the interference fringes. The interference fringes are provided to extend from the inner side to the outer side of the reflective volume hologram diffraction grating, and satisfy the Bragg condition. The Bragg condition is to satisfy the following Expression A. In Expression A, m is a positive integer, λ represents the wavelength, d represents the pitch of the grating surface (distance between virtual planes including interference fringes in the normal direction), and Θ represents the supplementary angle of the incident angle on the interference fringes. When light enters the diffraction grating member at an incident angle ψ, the supplementary angle Θ, the slant angle φ, and the incident angle ψ have the relationship given by Expression B:

$$m \cdot \lambda = 2 \cdot d \cdot \sin \Theta \quad (A)$$

$$\Theta = 90° - (\phi + \psi) \quad (B)$$

As described above, the first diffraction grating member 330 is provided (bonded) on the second surface 323 of the light guide plate 321, and diffracts and reflects parallel light incident on the light guide plate 321 from the first surface 322 so that the incident parallel light is totally reflected in the light guide plate 321. Further, the second diffraction grating member 340 is provided (bonded) on the second surface 323 of the light guide plate 321. The second diffraction grating member 340 diffracts and reflects the parallel light, which propagates in the light guide plate 321 by total reflection, a plurality of times, and emits the parallel light from the light guide plate 321 through the first surface 322. Alternatively, the light incident surface may be defined by the second surface 323, and the light exit surface may be defined by the first surface 322.

The parallel light beams of three colors, red, green, and blue, also propagate in the light guide plate 321 by total reflection, and are then emitted. In this case, since the light guide plate 321 is thin and the optical path in the light guide plate 321 is long, the number of total reflections made until the light beams reach the second diffraction grating member 340 varies according to the angle of view. More specifically, the number of reflections of parallel light that is incident at an angle such as to approach the second diffraction grating member 340, of parallel light incident on the light guide plate 321, is smaller than the number of reflections of parallel light that is incident on the light guide plate 321 at an angle such as to get away from the second diffraction grating member 340. This is because the parallel light, which is diffracted and reflected by the first diffraction grating member 330 and is incident on the light guide plate 321 at the angle such as to approach the second diffraction grating member 340, forms a smaller angle with the normal to the light guide plate 321 when the light propagating in the light guide plate 321 impinges on the inner surface of the light guide plate 321, than the parallel light that is incident on the light guide plate 321 at the angle in the opposite direction. The shape of the interference fringes provided in the second diffraction grating member 340 and the shape of the interference fringes provided in the first diffraction grating member 330 are symmetrical with respect to an imaginary plane perpendicular to the axis of the light guide plate 321.

A light guide plates 321 in Embodiment 4 described below basically has the same structure as that of the above-described light guide plate 321.

The image display apparatus of Embodiment 3 satisfies the following condition:

$$2t \cdot \tan \theta - 2 \leq W_Y \leq 2t \cdot \tan \theta + 2 \quad (2)$$

Figure 5:
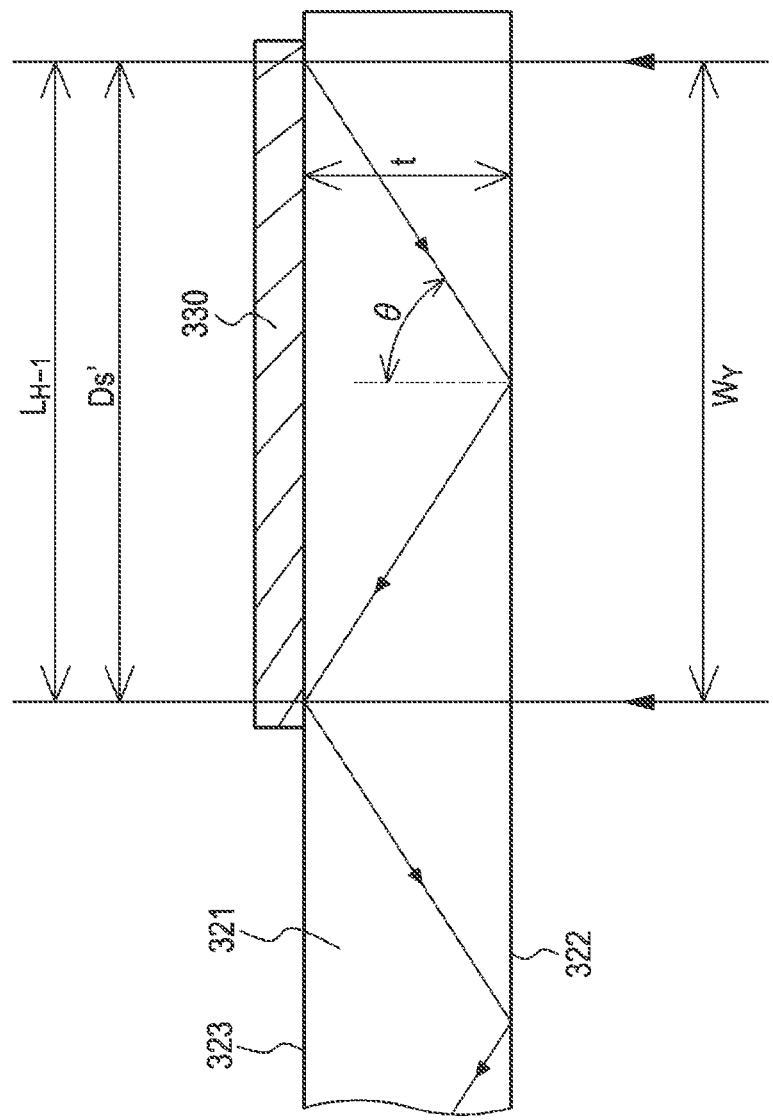
FIG. 5 is a conceptual view showing a state in which parallel light enters a light guide plate in the image display apparatus of Embodiment 3 or an image display apparatus of Embodiment 4.
Figure 14:
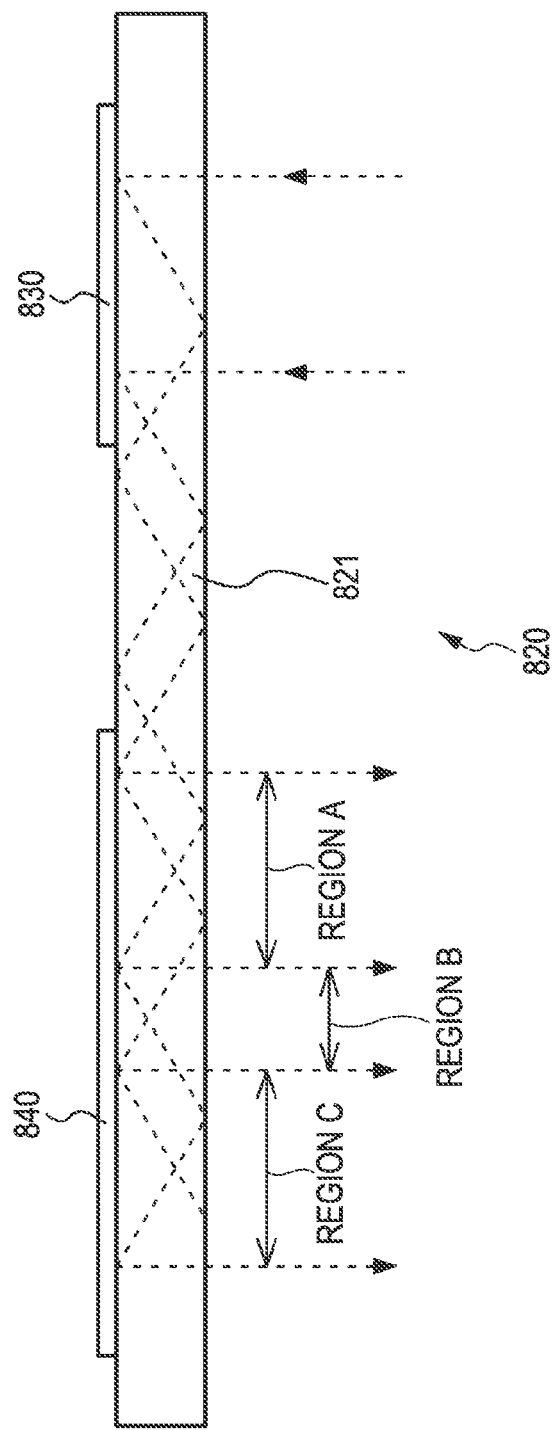
FIG. 14 is a conceptual view illustrating a problem of an image display apparatus of a second type in the related art.

Referring to FIG. 5 serving as a conceptual view, a light beam incident on the light guide plate 121 and having a width $W_Y$ in the Y-direction is diffracted or reflected by the first deflecting member 330, and propagates in the light guide plate 321 while being totally reflected. In this case, by setting the parameters, such as the width $W_Y$ in the Y-direction of the light beam incident on the light guide plate, the thickness t of the light guide plate, and the incident angle θ of the light beam, which is totally reflected in the light guide plate, on the inner surface of the light guide plate, so as to satisfy the condition that the propagating light beam does not overlap and fills the light guide plate 121 with no space, the phenomenon, which has been described with reference to FIG. 14, does not occur.

Assuming that Ds' (unit: mm) represents the distance by which the light travels while the light is diffracted or reflected once by the first diffraction grating member 330, is totally reflected by the light guide plate 321, and is totally reflected again by the light guide plate 321, the above-described condition is satisfied when $W_Y$ and Ds' have the relationship given by the following Expression (6):

$$Ds' = 2t \cdot \tan\theta \quad (6)$$

Therefore, when Expression (6) is satisfied, the light beam propagating in the light guide plate 321 by total reflection does not overlap in the light guide plate 121, and fills the light guide plate 321 with no space. Thus, even if the eye 10 of the observer moves in the Y-direction, the phenomenon shown in FIG. 14 does not occur, and the image brightness does not change rapidly. In other words, regardless of the region where the eye 10 of the observer is, light emitted from the collimating optical system 312 finally reaches the eye 10, and brightness unevenness and color unevenness are rarely caused because of the position of the eye of the observer in the image displayed by the image display apparatus 300. For this reason, it is possible to provide an image display apparatus that achieves a high display quality.

As described above, it is known through experiments that the observer does not visually recognize a great brightness change even when there is a gap of about 2 mm in the Y-direction between light beams emitted from the light guide plate, or even when there is an overlapping portion of about 2 mm between the light beams. Hence, the equal sign in Expression (6) can be increased to the range in Expression (2). For the same reason, the equal sign in Expression (7) described below can be increased to the range in Expression (8).

Figure 6:
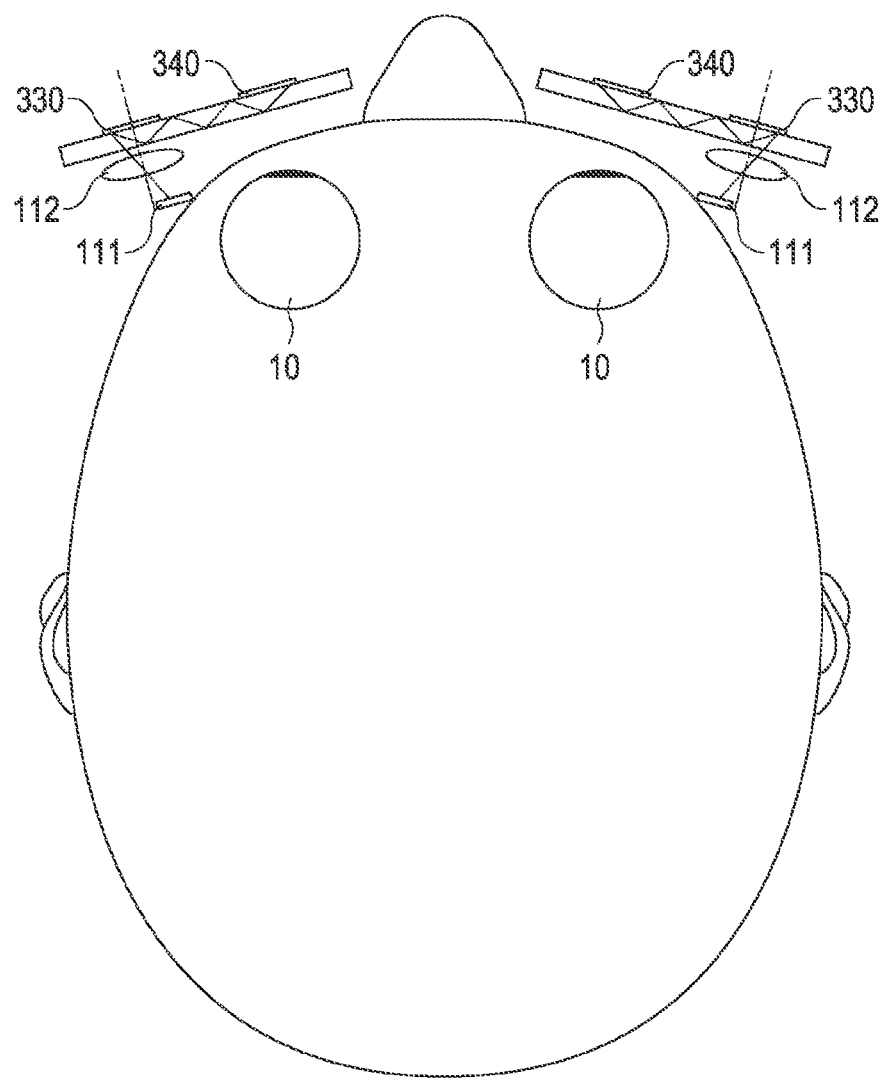
FIG. 6 is a conceptual view showing a state in which the observer wears two image display apparatuses of Embodiment 3.

An image display apparatus including an optical device that satisfied the upper and lower limits in Expression (2) was actually produced by way of trial, and images displayed by the image display apparatus were observed. As a result of observation, it was not found that brightness unevenness and color unevenness were caused in the display images because of the positions of the eyes of the observer. FIG. 6 is a conceptual view showing a state in which the observer wears two image display apparatuses according to Embodiment 3.

To satisfy the condition that the light propagating in the light guide plate 321 by total reflection does not overlap in the light guide plate 321 and fills the light guide plate 321 with no space, it is more preferable that light, which is diffracted or reflected once by the first diffraction grating member 330 and is totally reflected in the light guide plate 321 do not enter the first diffraction grating member 330 again. In other words, it is more preferable to satisfy the following condition:

$$L_{h-1} = 2t \cdot \tan\theta \quad (7)$$

where $L_{h-1}$ (unit: mm) represents the effective length of the first deflecting member 330 in the Y-direction. As described above, the equal sign in Expression (7) can be increased to the range in the following Expression (8):

$$2t \cdot \tan\theta - L_{h-1} 2t \cdot \tan\theta + 2 \quad (8)$$

Embodiment 4

FIG. 7 is a conceptual view of an image display apparatus according to Embodiment 4. In an image display apparatus 400 of Embodiment 4, a light source 251, a collimating optical system 252, a scanning member 253, a relay optical system 254, etc. have the same structures as those adopted in Embodiment 2. Further, an optical device 320 has the same structure as that of the optical device 320 in Embodiment 3. Light incident on the optical device 320 behaves in a manner similar to that adopted in Embodiment 3.

In Embodiment 4, an image display apparatus including an optical device that satisfied the upper and lower limits in Expression (2) was actually produced by way of trial, and images displayed by the image display apparatus were observed. As a result of observation, it was not found that brightness unevenness and color unevenness were caused in the display images because of the positions of the eyes of the observer.

While the present application has been described above with reference to the preferred embodiments, it is not limited to these embodiments. The configurations of the image display apparatuses in the embodiments are just exemplary, and can be changed appropriately. For example, in the optical device of Embodiment 3 or 4, a first deflecting member formed by a transmissive hologram may be provided on the first surface 322 of the light guide plate 321, and a second deflecting member formed by a reflective hologram may be provided on the second surface 323. In this structure, light incident on the first deflecting member is diffracted, satisfies the total reflection condition in the light guide plate, and propagates to the second deflecting member. Then, the light is diffracted or reflected by the second deflecting member, and is emitted from the light guide plate. Further, in the optical device of Embodiment 3 or 4, each diffraction grating element may be formed by a transmissive diffraction grating element. Alternatively, one of the first deflecting member and the second deflecting member may be formed by a reflective diffraction grating element, and the other may be formed by a transmissive diffraction grating element. Further alternatively, the diffraction grating element may be formed by a reflective blazed diffraction grating element or a surface relief hologram.

Figure 8:
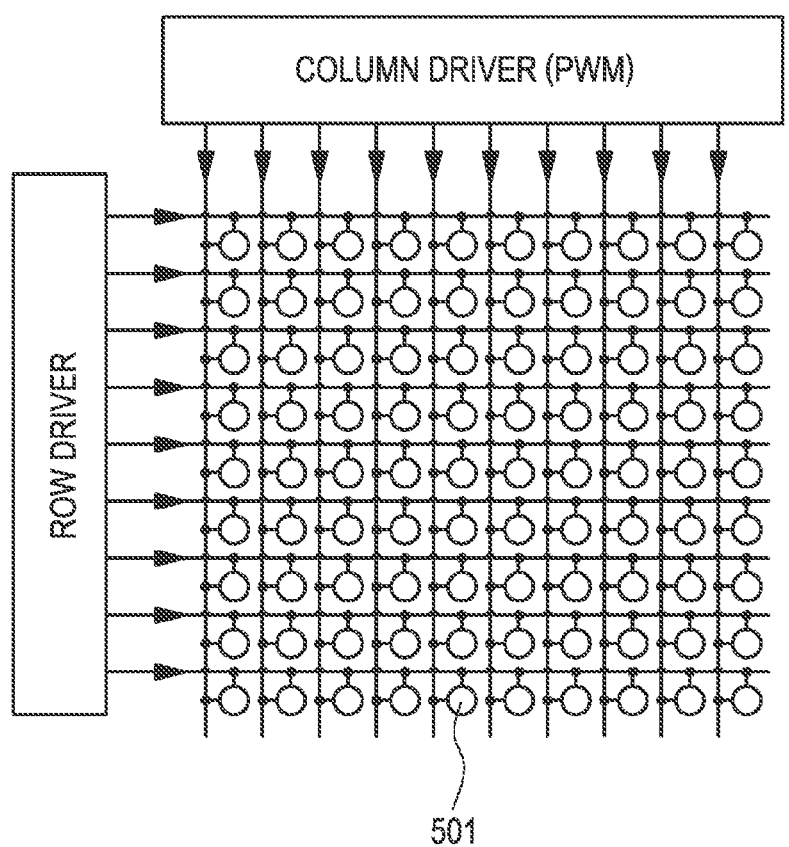
FIG. 8 is a conceptual view of a modification of an image forming device that is suitable for use in Embodiment 1 or 3.

As a modification of an image forming device suitably used in Embodiment 1 or 3, for example, an active matrix image forming device shown in FIG. 8 serving as a conceptual view can be adopted. This image forming device is formed by a light emitting panel in which semiconductor light emitting elements 501 are arranged in a two-dimensional matrix, and displays an image by controlling a light-emitting/non-light-emitting state of each light emitting element 501 so that the state of the light emitting element 501 is visible directly. Light emitted from the image forming device enters the light guide device 121 or 321 via the collimating optical system 112.

Figure 9:
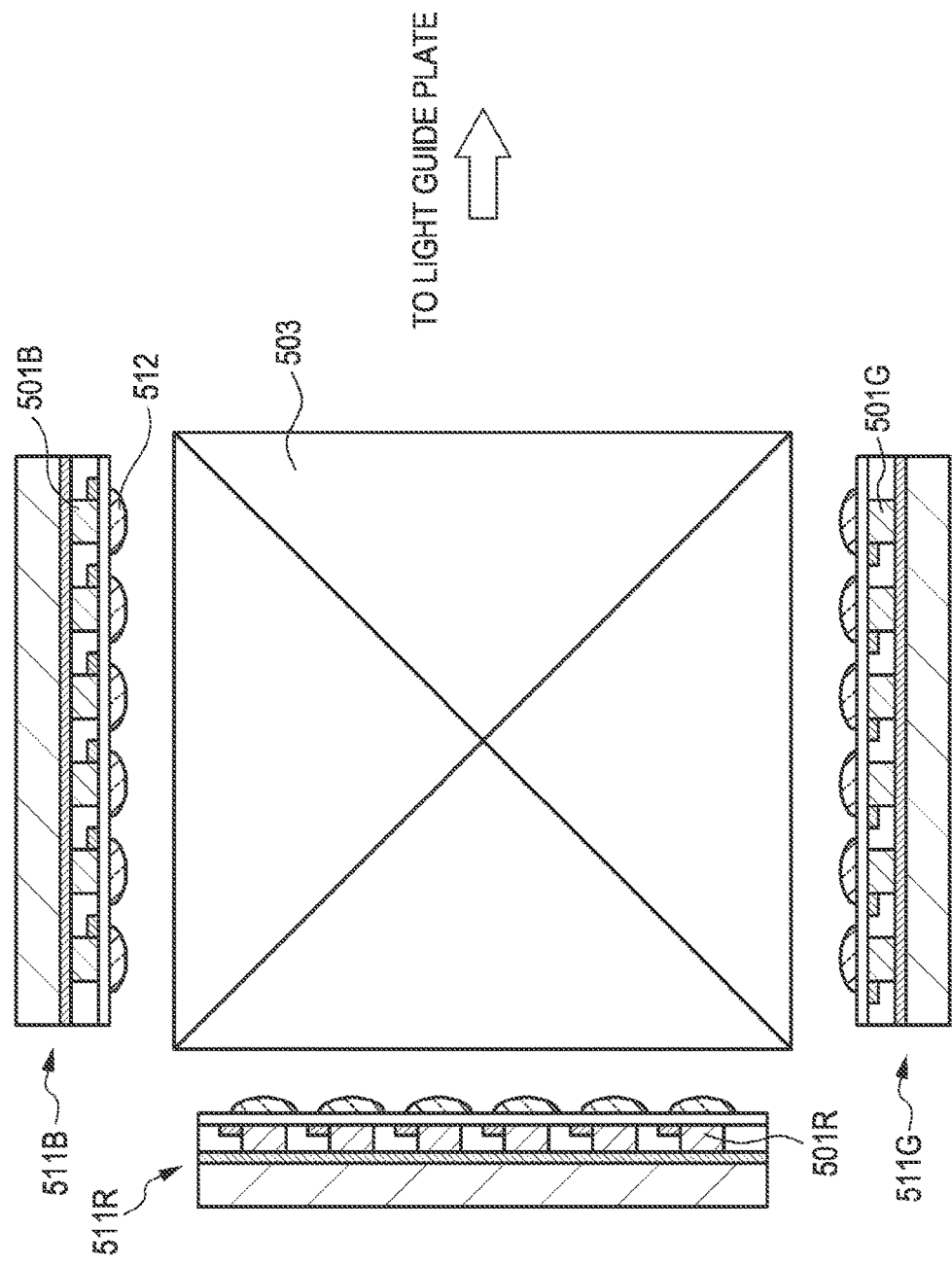
FIG. 9 is a conceptual view of another modification of an image forming device that is suitable for use in Embodiment 1 or 3.

Alternatively, a color display image forming device shown in FIG. 9 serving as a conceptual view can be used. The image forming device includes:

(a) a red light emitting panel 511R in which red light emitting elements 501R for emitting red light are arranged in a two-dimensional matrix;

(b) a green light emitting panel 511G in which green light emitting elements 501G for emitting green light are arranged in a two-dimensional matrix;

(c) a blue light emitting panel 511B in which blue light emitting elements 501B for emitting blue light are arranged in a two-dimensional matrix; and (d) a combining unit that combines optical paths of light beams emitted from the red, green, and blue light emitting panels 511R, 511G, and 511B into one optical path (e.g., a dichroic prism 503).

Light-emitting/non-light-emitting states of the red, green, and blue light emitting elements 501R, 501G, and 501B are controlled independently. Light emitted from this image forming device also enters the light guide plate 121 or 321 via the collimating optical system 112. Reference numeral 512 in FIG. 9 denotes microlenses for collecting light emitted from the light emitting elements.

Figure 10:
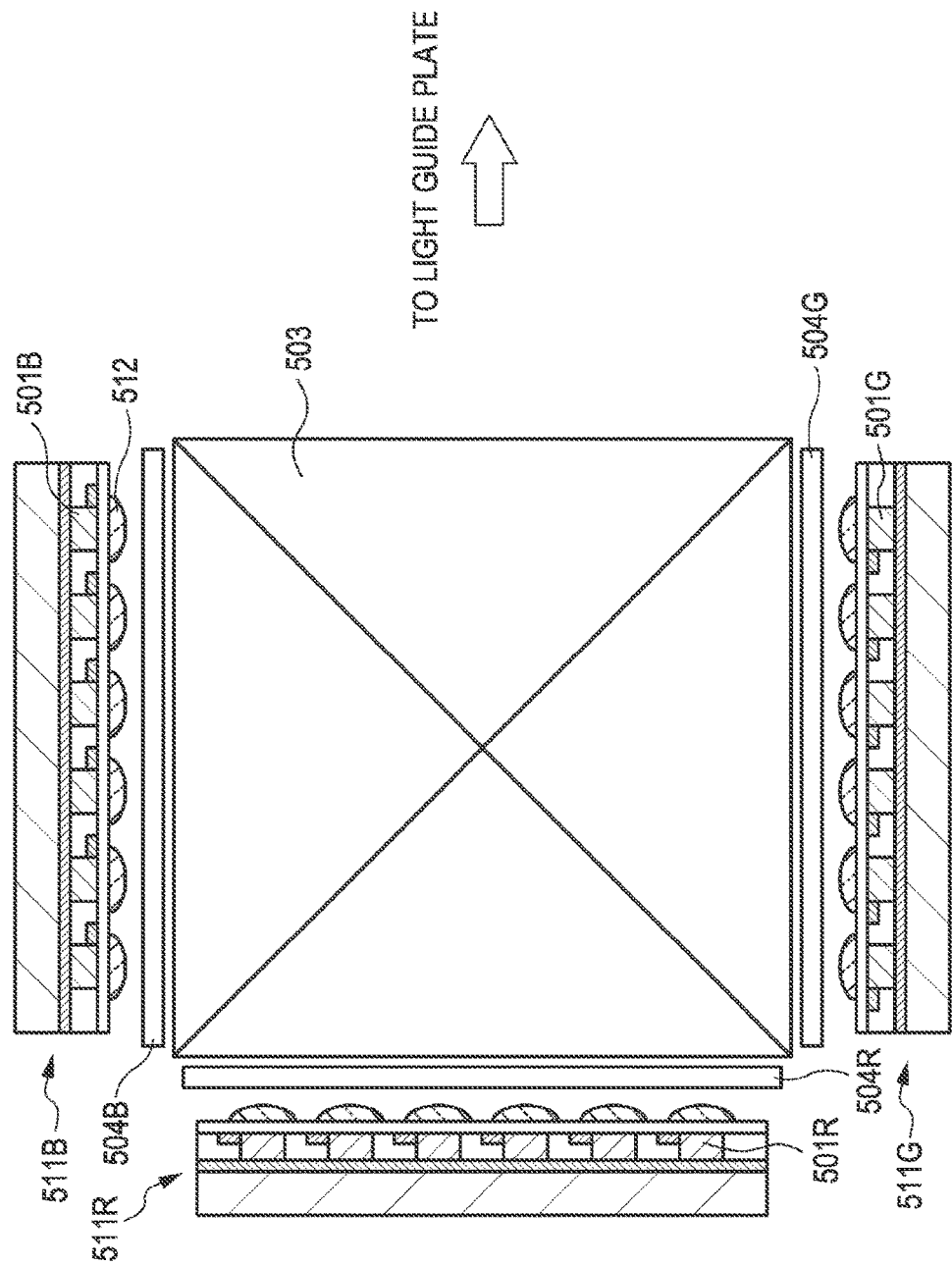
FIG. 10 is a conceptual view of a further modification of an image forming device that is suitable for use in Embodiment 1 or 3.

FIG. 10 is a conceptual view of another image forming device including light emitting panels 511R, 511G, and 511B in which light emitting elements 501R, 501G, and 501B are arranged in a two-dimensional matrix. Light beams emitted from the light emitting panels 511R, 511G, and 511B enter a dichroic prism 503 after transmission/non-transmission thereof is controlled by light transmission control units 504R, 504G, and 504B. The optical paths of the light beams are combined into one optical path by the dichroic prism 503, and the light beams then enter the light guide plate 121 or 321 via the collimating optical system 112.

Figure 11:
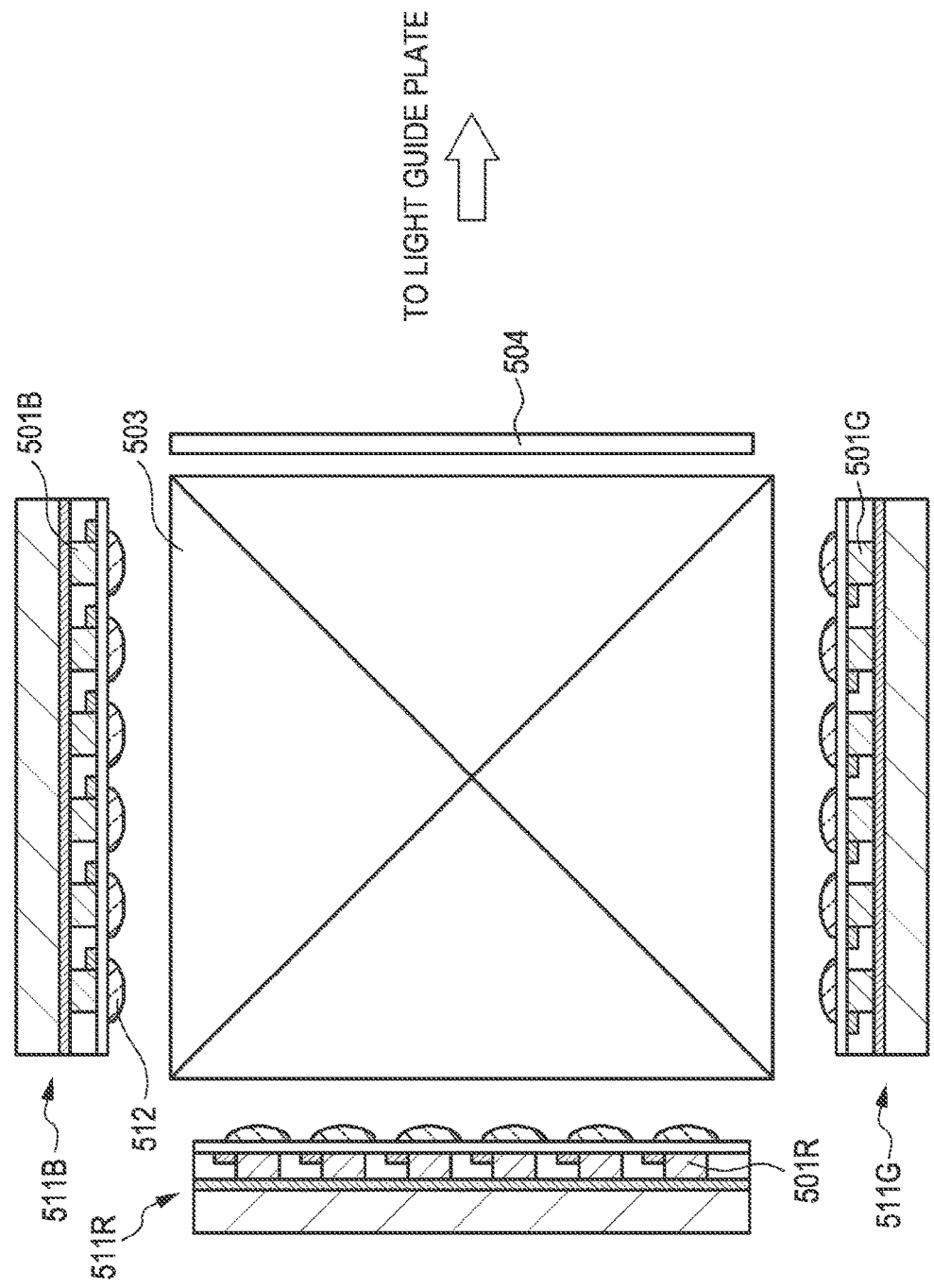
FIG. 11 is a conceptual view of a further modification of an image forming device that is suitable for use in Embodiment 1 or 3.

FIG. 11 is a conceptual view of a further image forming device including light emitting panels 511R, 511G, and 511B in which light emitting elements 501R, 501G, and 501B are arranged in a two-dimensional matrix. Light beams emitted from the light emitting panels 511R, 511G, and 511B enter a dichroic prism 503, where the optical paths thereof are combined into one optical path. Transmission/non-transmission of the light emitted from the dichroic prism 503 is controlled by a light transmission control unit 504, and the light then enters the light guide plate 121 or 321 via the collimating optical system 112.

Figure 12:
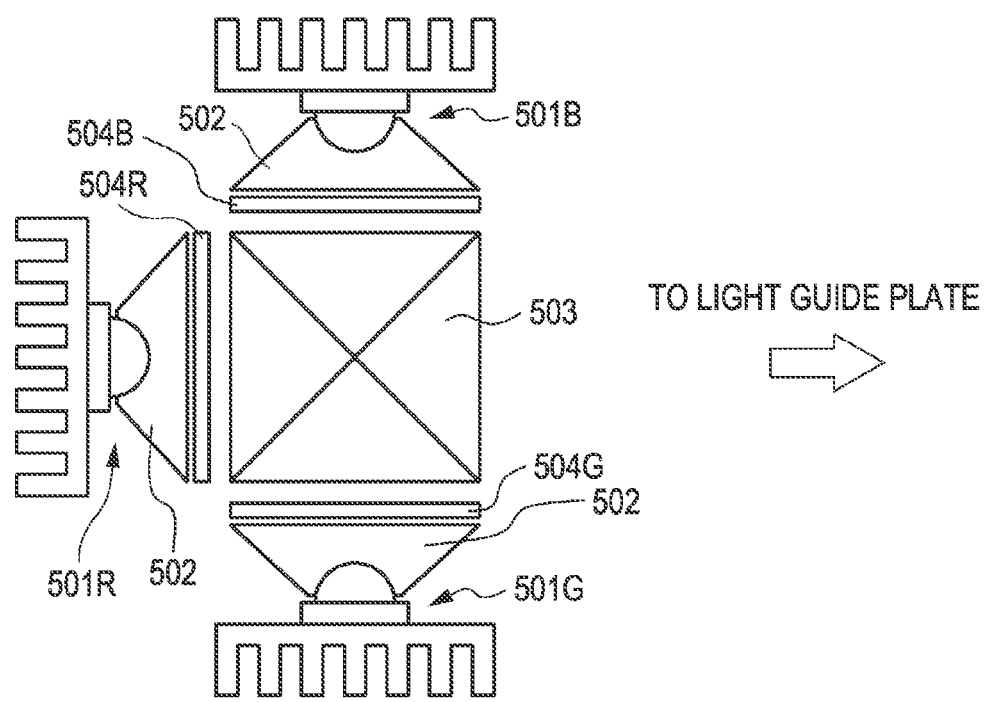
FIG. 12 is a conceptual view of a further modification of an image forming device that is suitable for use in Embodiment 1 or 3.

Alternatively, an image forming device shown in FIG. 12 can be used. The image forming device includes a light emitting element 501R for emitting red light, a light transmission control unit (e.g., a liquid crystal display 504R) serving as a kind of light valve for controlling transmission/non-transmission of the red light emitted from the light emitting element 501R, a light emitting element 501G for emitting green light, a light transmission control unit (e.g., a liquid crystal display 504G) serving as a kind of light valve for controlling transmission/non-transmission of the green light emitted from the light emitting element 501G, a light emitting element 501B for emitting blue light, a light transmission control unit (e.g., a liquid crystal display 504B) for controlling transmission/non-transmission of the blue light emitted from the light emitting element 501B, light guide members 502 for guiding the light emitted from the light emitting elements 501R, 501G, and 501B, and a combining unit for combining the optical paths of the light into one optical path (e.g., a dichroic prism 503). The light emitting elements 501R, 501G, and 501B are each formed of a GaN semiconductor.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. An image display apparatus comprising:
an image forming device including a plurality of pixels;
a collimating optical system configured to convert light emitted from the pixels in the image forming device into parallel light; and
an optical device on which the parallel light is incident from the collimating optical system, in which the parallel light is guided, and from which the parallel light is emitted,
wherein the optical device includes a light guide plate including a first deflecting member and a second deflecting member,
wherein at least one of the first deflecting member and the second deflecting member includes a plurality of diffraction grating layers which are arranged at a desired pitch with a desired slant angle, and
wherein the first deflecting member and the second deflecting member are provided in the light guide plate, and wherein the light having a wavelength emitted from at least one of the pixels satisfies the following condition:

$$2t \sin \theta - 2 \leq W_Y \leq 2t \sin \theta + 2$$

wherein an axial direction of the light guide plate is a Y-direction, a normal direction of the light guide plate is an X-direction, $W_Y$ represents the width in the Y-direction of the light incident on the light guide plate, t represents a thickness of the light guide plate, and θ represents an incident angle of the light, which is totally reflected in the light guide plate, on an inner surface of the light guide plate.

2. The image display apparatus according to claim 1, wherein the first deflecting member is configured to diffract the light incident on the light guide plate, and the second deflecting member is configured to diffract the light in the light guide plate.

3. The image display apparatus according to claim 2, wherein the first deflecting member and the second deflecting member include diffraction grating elements.

4. The image display apparatus according to claim 3, wherein the diffraction grating elements include a reflective diffraction grating element and a transmissive diffraction grating element.

5. The image display apparatus according to claim 1, wherein the optical system includes at least a convex lens.

6. The image display apparatus according to claim 1, further comprising:
a scanning member configured to scan light emitted from the optical system; and
a relay optical system configured to relay the light scanned by the scanning member to the optical device.

7. The image display apparatus according to claim 1, wherein the image forming device is provided at a position corresponding to a focal length of the optical system.

8. The image display apparatus according to claim 1, wherein the image forming device includes a light source.

9. The image display apparatus according to claim 8, wherein the light source is a light emitting diode.

10. The image display apparatus according to claim 8, wherein the image forming device further includes a polarizing beam splitter.

11. The image display apparatus according to claim 1, wherein the light guide plate includes at least one of a glass or a plastic material.

12. The image display apparatus according to claim 11, wherein the light guide plate has two substantially parallel surfaces.

13. The image display apparatus according to claim 1, wherein the light guide plate is transparent.

14. The image display apparatus according to claim 1, wherein a length of the second deflecting member is different from the first deflecting member.

15. The image display apparatus according to claim 1, wherein a width of the second deflecting member is different from the first deflecting member.

16. The image display apparatus according to claim 1, wherein the first deflecting member includes a reflective volume hologram diffraction grating.

17. The image display apparatus according to claim 1, wherein the first deflecting member and the second deflecting member are provided in the light guide plate.

18. The image display apparatus according to claim 17, wherein the first deflecting member includes a single layer light reflective film.

19. The image display apparatus according to claim 17, wherein the diffraction grating layers are formed by forming one diffraction grating layer of an adhesive photopolymer material, and then bonding layers of the adhesive photopolymer material thereon in order.

* * * * *